July 1, 1930. A. Z. MAMPLE 1,769,524
SECTIONALIZING AND TERMINATING LEAD SHEATH CABLES
Filed March 19, 1929
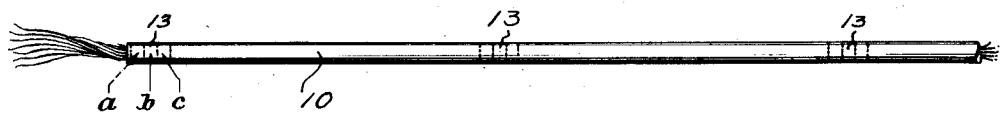
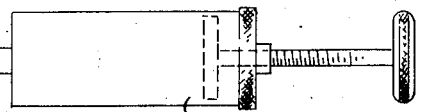
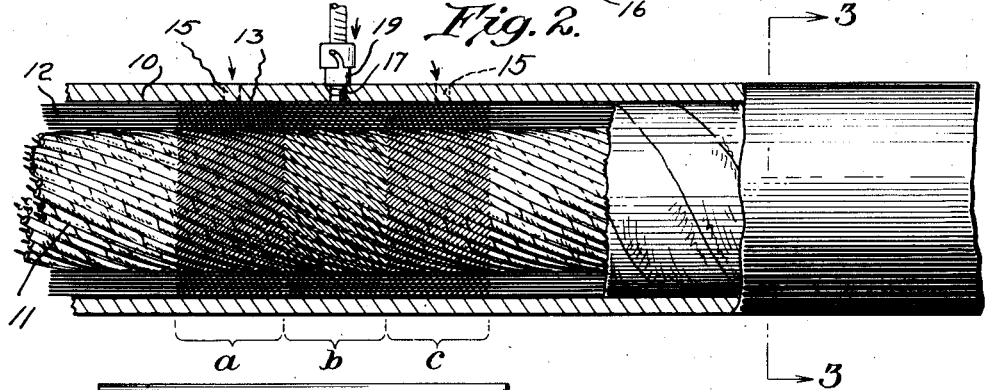
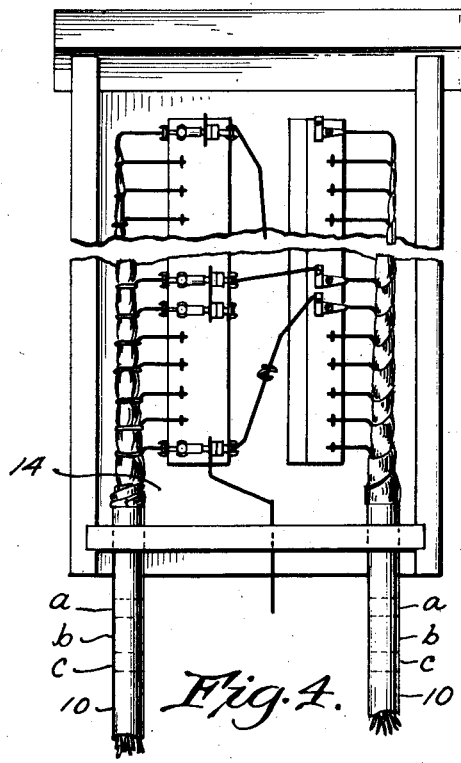
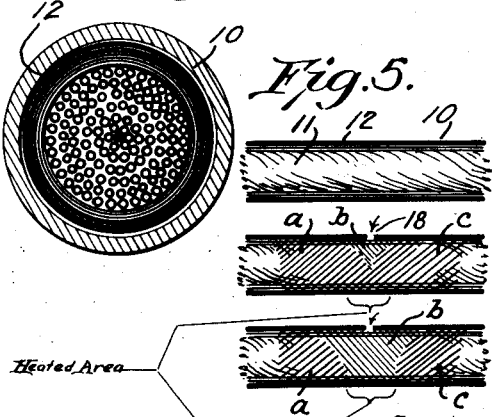
Inventor
A. Z. Mample
Eugene C. Brown
Attorney Patented July 1, 1930

1,769,524

UNITED STATES PATENT OFFICE

ADOLPH Z. MAMPLE, OF GLEN ROCK, NEW JERSEY, ASSIGNOR TO THE WESTERN UNION TELEGRAPH COMPANY, OF NEW YORK, N. Y., A CORPORATION OF NEW YORK

SECTIONALIZING AND TERMINATING LEAD SHEATH CABLES

Application filed March 19, 1929. Serial No. 348,346.

This invention relates to dams for sectionalizing and terminating lead sheathed conducting cables and has special reference to a trisectional cable dam for such purposes.

Such dams are used in connection with testing for defects in the sheath and splices of a lead cable. The most practicable method of making such tests involves the compression of a gas within the cable. In order to place a cable under pressure, it is necessary that the cable be effectively dammed at both ends and at the ends of all of its branch or lateral cables. Further, in the testing of long lengths of cable, it becomes necessary to divide the cable to be tested into sections by means of obstructions or dams placed in the cable at selected distances apart. Dams which have been used in the past for such purposes have been only partially effective, and in addition are expensive to install. The dam forming the subject matter of the present invention is new in principle, highly efficient and relatively inexpensive to make.

Furthermore, when a lead sheathed cable is terminated it is necessary to prevent moisture or dampness from entering the end of the cable. Heretofore this has been accomplished by the use of terminal heads, potheads, pothead cables and similar methods, all of which are expensive and only partially efficient. The dam forming this invention may be used to terminate lead sheathed cables by sealing the cable with the proposed dam at the point where the sheath is removed, thereby permitting the cable conductors to be treated, formed and terminated without splicing to a special type of cable, pothead or terminal.

Among the objects of the present invention are to provide an improved form of cable dam having the point of efficiency against the passage of gas, moisture or dampness, to provide a dam for this purpose so constructed as to be self sealing with respect to any cracks or interstices in the dam material and to provide an improved method of forming the dam.

Another important object of terminating cables in this manner is that the dam used in making the terminal for the cable serves the dual purpose of terminating and sealing the ends of the cable and of its branch or lateral cables. Thus when a cable is to be tested with gas, the necessity for making dams at the ends of the cable and at the ends of its branch or lateral cables, is eliminated, thereby effecting considerable economy when testing cables in this manner.

With the above and other objects in view the invention will now be specifically described and particularly claimed, reference being had to the accompanying drawings, wherein:

Figure 1 is a side elevation of a cable equipped at intervals with the improved dam.

Figure 2 is an enlarged detail view partly in elevation and partly in section of such a cable showing the improved dam and one method of forming the same.

Figure 3 is a section on the line 3—3 of Figure 2.

Figure 4 is a detail view illustrating a cable box with cables extending therein and equipped adjacent their ends with the improved dam.

Figure 5 is a diagrammatic view showing the successive steps in the formation of a dam by one of the methods herein set forth.

In the accompanying drawings there has been shown a cable having a sheath 10 of lead or the like and in this sheath is carried a multiplicity of insulated wires 11, each of said wires having the usual conductor core and insulating wrapping, the latter being commonly of paper. The bundle of wires thus formed is surrounded by insulating paper wrappings 12 which thus protects the individual wire insulations from contact with the sheath 10 and holds the wires centrally of the sheath.

By reference to Figure 1 it will be seen that such a cable may be divided into sections for test and it will be noted that there is disclosed in this figure a series of dams 13. Referring to Figure 2 it will be seen that each of these dams consists of three zones, $a$, $b$ and $c$, the zone $b$ being between zones $a$ and $c$. In Figure 4 such a dam is shown adjacent the terminal of each of the cables 10 where they extend into the cable box 14 for terminating the individual wires of the cable to enable instruments to be connected thereto, for cross-connecting purposes or for connecting to electrical protection apparatus.

The proposed dam, which will hereinafter be referred to as a trisectional dam, is, in general, made by making two dams of a relatively hard material such as a mineral wax having a high melting point at least as high as 120° F. These two dams are located about twelve inches apart. In order to insert this material into the cable suitable openings, see Figure 2, 15 may, under one form of operating the invention, be made in the sheath 10. Then by means of any suitable apparatus such as the pressure gun 16, connected to the cable at these openings, the hard material is forced into the cable at as low a temperature as practicable and is permitted to solidify. Intermediate these openings 15 there is formed a further opening 17 and through this opening is forced, in the same manner, a semi-liquid material which is inserted in the sheath at such a low temperature that it does not melt the hard material of the zones $a$ and $c$. This material, of semi-liquid nature, may consist of a mixture of a high melting point mineral wax and rosin oil or may be of a similarly highly viscous material. The purpose and advantages of this arrangement of trisectional dam will be well understood from what follows. In the first place, to obtain a thorough seal for damming off of a section of the cable, it is obvious that any material used must be capable of being completely absorbed by the paper insulation and of adhering to the copper conductors and the sheath. Otherwise, leakage would occur along the conductors and the sheath even though the interstices were adequately sealed. Furthermore, since cables in practice are subjected to a wide range of temperature variation (minus 40° to 150° F.) which produces both longitudinal and radial expansion, and since the coefficients of expansion of the materials generally used in a cable, that is, lead, copper and paper, are widely different it is evident that a suitable material for a dam must not only be very resilient, but capable of retaining its resiliency.

While ordinary materials used in this trisectional dam possesses in itself all of the above characteristics, the combination of the two materials employed in the manner described above accomplishes the desired result and affords a dam having all of the said characteristics. The wax or hard material used is in itself not resilient and has a tendency to contract after application and to crack under normal temperatures. It is, however, readily absorbed by the paper insulation and adheres in a very satisfactory manner to the conductor and sheath, the semi-liquid material used in combination with the hard material counteracts the deficiencies of the latter material. Thus, when compressed gas is applied to the dam at one end and leaks through cracks or interstices in the nearest hard section, the pressure thus produced on the viscous semi-liquid material in the midsection seals any minute openings or interstices in the other hard section and prevents the gas from passing through the dam. Obviously, pressure on the other side of the dam by a gas will act to seal any interstices in the opposite direction. In practice, for the low pressures usually employed which run from atmospheric pressure to twenty pounds per square inch, both hard sections are effectively sealed and remain so.

As before stated the dam may be made in three sections by the employment of three holes in the sheath and even an ordinary funnel may be used to convey the material to the interior of the sheath. In such case the cable is heated and melted wax sufficient to form the end sections is poured in the two end holes and permitted to solidify. A semi-liquid material, as previously described, is then melted and poured in the middle hole so that it completely fills the center section of the dam. After the dam is completed the holes in the sheath are soldered. If, due to aging or rupture at high pressure the dam should leak slightly, it may be resealed by reheating the cable at the center of the dam and adding to the middle section a small amount of the semi-liquid material.

Another method which may be used in the formation of the dam and which in most cases is preferable is to provide a single opening such as is shown at 18 in Figure 5 and to solder a connection fitting 19, as in Figure 2, thereto. The pressure gun is connected to the fitting 19 and the hard material is inserted at a comparatively low temperature by pressure. Enough of the hard material is inserted in this way to fill the cable approximately two feet on both sides of the openings which has been made in the sheath. This material is now permitted to harden. Heat is applied to the center of the impregnated zone so that about twelve inches of the wax has become soft. The semi-liquid material is then forced into the center of the hard material so as to form the semi-liquid section of the dam between the two adjacent hard sections as heretofore set forth. By reference to Figure 5 the effect of this operation may be clearly seen.

Having thus described the invention, what is claimed as new, is:

1. A dam for sectionalizing and terminating electric cables and including a pair of spaced and relatively hard dam sections, and an intermediate and relatively soft dam section in the space between the pair of sections.

2. A dam for sectionalizing and terminating electric cables and including a pair of spaced and relatively hard dam sections, and an intermediate viscous dam section in the space between the pair of sections.

3. The combination with a cable having a sheath; of a pair of rigid dam sections filling the interstices within the sheath at spaced points, and a plastic dam section within said sheath between the first sections.

4. The combination with a cable having a sheath; of a pair of rigid dam sections filling the interstices within the sheath at spaced points, and a plastic and viscous dam section within said sheath between the first sections.

5. A dam for sectionalizing and terminating electric cables including a pair of spaced and hard dam sections having a melting point sufficiently high to prevent softening of the dam material under conditions of use, and a soft plastic dam section interposed between the hard sections.

6. A dam for sectionalizing and terminating electric cables including a pair of spaced and hard dam sections having a melting point sufficiently high to prevent softening of the dam material under conditions of use, and a soft plastic dam section interposed between the hard sections, said plastic section remaining soft at temperatures below the hardening temperature of the hard sections.

7. A dam for sectionalizing and terminating electric cables including a pair of spaced dam sections of mineral wax having a melting point at least as high as 120° F., and a viscous intermediate dam section consisting of a mixture of mineral wax and rosin oil.

8. That process of damming off a length of sheathed electric cable which consists in introducing into the cable high melting point dam material to form a pair of spaced dam sections, permitting said sections to harden, and introducing into the space between the hardened sections plastic dam material at a temperature below that necessary to soften the hard sections.

In testimony whereof I affix my signature.
ADOLPH Z. MAMPLE.